United States Patent
Lu et al.

(10) Patent No.: US 11,722,975 B2
(45) Date of Patent: Aug. 8, 2023

(54) COORDINATING COMMUNICATION LINKS FOR ARTIFICIAL REALITY

(71) Applicant: Meta Platforms Technologies, LLC, Menlo Park, CA (US)

(72) Inventors: Gang Lu, Pleasanton, CA (US); Amit Shukla, Fremont, CA (US); Dong Zheng, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/972,227

(22) Filed: Oct. 24, 2022

(65) Prior Publication Data

US 2023/0045725 A1 Feb. 9, 2023

Related U.S. Application Data

(63) Continuation of application No. 17/171,843, filed on Feb. 9, 2021, now Pat. No. 11,490,345.

(60) Provisional application No. 63/091,851, filed on Oct. 14, 2020.

(51) Int. Cl.
*H04W 56/00* (2009.01)
*H04W 52/02* (2009.01)
*H04W 72/56* (2023.01)

(52) U.S. Cl.
CPC ...... *H04W 56/001* (2013.01); *H04W 52/0206* (2013.01); *H04W 72/56* (2023.01)

(58) Field of Classification Search
CPC .......... H04W 56/001; H04W 52/0206; H04W 72/10; H04W 72/0446; H04W 52/0216
See application file for complete search history.

(56) References Cited

U.S. PATENT DOCUMENTS

2009/0232126 A1\* 9/2009 Cordeiro ............... H04W 72/02
  370/350
2017/0280388 A1\* 9/2017 Asterjadhi ........ H04W 52/0216

FOREIGN PATENT DOCUMENTS

EP 2992724 A1 3/2016

OTHER PUBLICATIONS

International Search Report and Written Opinion for International Application No. PCT/US2021/045018, dated Nov. 22, 2021, 8 pages.

\* cited by examiner

*Primary Examiner* — Kyaw Z Soe
(74) *Attorney, Agent, or Firm* — Foley & Lardner LLP

(57) ABSTRACT

Disclosed herein are related to coordinating communication among a first access point, a first station device, a second access point, and a second station device. In one aspect, the second access point receives, from the first access point, a first beacon of the first access point at a first beacon transmission time. The first beacon may indicate an offset between the first beacon transmission time of the first beacon and a first data transmission time of the first access point for communication between the first access point and a first station device. In one aspect, the second access point may determine, according to the offset, a second data transmission time of the second access point to be distinct from the first data transmission time of the first access point. The second access point may communicate with a second station device, according to the second data transmission time.

20 Claims, 5 Drawing Sheets

COORDINATING COMMUNICATION LINKS FOR ARTIFICIAL REALITY

CROSS-REFERENCE TO RELATED APPLICATION

This application is a continuation of and claims the benefit of and priority to U.S. Non-Provisional patent application Ser. No. 17/171,843, titled "COORDINATING COMMUNICATION LINKS FOR ARTIFICIAL REALITY," which was filed on Feb. 9, 2021 and which claims the benefit of and priority to U.S. Provisional Patent Application No. 63/091,851, filed Oct. 14, 2020, all of which are incorporated herein by reference in their entirety and for all purposes.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a computing device communicatively coupled to the HWD. In one example, the HWD includes various sensors that detect a location and/or orientation of the HWD, and transmits the detected location and/or orientation of the HWD to the computing device. The computing device can determine a user's view of the space of the artificial reality according to the detected location and/or orientation of the HWD, and generate image data indicating an image of the space of the artificial reality corresponding to the user's view. The computing device can transmit the image data to the HWD, according to which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). A latency between a movement of the user wearing the HWD and an image displayed corresponding to the user movement can cause judder, which may result in motion sickness and can degrade the user experience.

SUMMARY

Various embodiments disclosed herein are related to coordinating communication links for artificial reality. In some embodiments, the method includes wirelessly receiving, from a first access point by a second access point, a first beacon of the first access point at a first beacon transmission time. In some embodiments, the first beacon indicates an offset between the first beacon transmission time of the first beacon and a first data transmission time of the first access point for communication between the first access point and a first station device. In some embodiments, the method includes determining, by the second access point according to the offset indicated by the first beacon, a second data transmission time of the second access point to be distinct from the first data transmission time of the first access point. In some embodiments, the method includes communicating, by the second access point with a second station device, according to the second data transmission time.

In some embodiments, the method includes entering, by the second access point, a wake up mode from a sleep mode during a predetermined time interval. In some embodiments, the second access point is configured to receive the first beacon, during the predetermined time interval. In some embodiments, the predetermined time interval includes at least a time interval between two adjacent beacon transmission times of the second access point.

In some embodiments, the method includes detecting, by the second access point, an unsuccessful communication with the second station device. In some embodiments, the method includes entering, by the second access point, a wake up mode from a sleep mode to receive the first beacon, in response to detecting unsuccessful communication with the second station device.

In some embodiments, the step/operation of determining, by the second access point according to the offset indicated by the first beacon, the second data transmission time of the second access point includes determining, by the second access point, the first data transmission time according to the first beacon transmission time and the offset, and scheduling, by the second access point, the second data transmission time to be distinct from the determined first data transmission time. In some embodiments, the method includes scheduling, by the second access point, a set of data transmission times of the second access point according to the first beacon transmission time and the offset. In some embodiments, each data transmission time from the set of data transmission times of the second access point is separate from or non-overlapping with a corresponding one from another set of data transmission times of the first access point. In some embodiments, each data transmission time from the set of data transmission times of the second access point is separated from an adjacent one from the set of data transmission times by a same time interval.

In some embodiments, the method includes broadcasting, by the second access point, an offset of the second access point between a second beacon transmission time and the second data transmission time of the second access point. In some embodiments, the method includes determining, by the second access point, a priority between the first access point and the second access point according to a policy. In some embodiments, the second access point determines the second data transmission time of the second access point, in response to determining that the first access point has the priority over the second access point. In some embodiments, determining, by the second access point, the priority between the first access point and the second access point according to the policy includes comparing, by the second access point, a first duration during which the first access point has been in operation, and a second duration during which the second access point has been in operation, and determining, by the second access point, that the first access point has the priority over the second access point, in response to determining that the first duration is longer than the second duration.

Various embodiments disclosed herein are related to a first access point including a wireless interface and one or more processors coupled to the wireless interface. In some embodiments, the wireless interface is configured to communicate with a first station device. In some embodiments, the one or more processors are configured to cause the wireless interface to wirelessly receive, from a second access point, a first beacon of the second access point at a first beacon transmission time. In some embodiments, the first beacon indicates an offset between the first beacon transmission time of the first beacon and a first data transmission time of the second access point for communication between the second access point and a second station device. In some embodiments, the one or more processors are configured to determine, according to the offset indicated by the first beacon, a second data transmission time of the first access point to be distinct from the first data transmission time of the second access point. In some embodiments, the one or more processors are configured to cause the wireless interface to communicate with the first station device, according to the second data transmission time.

In some embodiments, the one or more processors are configured to enter a wake up mode from a sleep mode during a predetermined time interval, and to cause the wireless interface to receive, from the second access point, the first beacon of the second access point during the predetermined time interval. In some embodiments, the predetermined time interval includes at least a time interval between two adjacent beacon transmission times of the first access point. In some embodiments, the one or more processors are configured to detect an unsuccessful communication with the first station device, and cause the wireless interface to enter a wake up mode from a sleep mode to receive the first beacon, in response to detecting unsuccessful communication with the first station device.

In some embodiments, the one or more processors are configured to determine, according to the offset indicated by the first beacon, the second data transmission time of the first access point by determining the first data transmission time according to the first beacon transmission time and the offset, and scheduling the second data transmission time to be distinct from the determined first data transmission time. In some embodiments, the one or more processors are configured to schedule a set of data transmission times of the first access point according to the first beacon transmission time and the offset. In some embodiments, each data transmission time from the set of data transmission times of the first access point is separate from or non-overlapping with a corresponding one from another set of data transmission times of the second access point. In some embodiments, each data transmission time from the set of data transmission times of the first access point is separated from an adjacent one from the set of data transmission times by a same time interval.

In some embodiments, the one or more processors are configured to cause the wireless interface to broadcast an offset of the first access point between a second beacon transmission time and the second data transmission time of the first access point. In some embodiments, the one or more processors are configured to determine a priority between the first access point and the second access point according to a policy. In some embodiments, the one or more processors are configured to determine the second data transmission time of the first access point, in response to determining that the second access point has the priority over the first access point. In some embodiments, the one or more processors are configured to determine the priority between the first access point and the second access point according to the policy by comparing a first duration during which the first access point has been in operation, and a second duration during which the second access point has been in operation, and determining that the second access point has the priority over the first access point, in response to determining that the second duration is longer than the first duration.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
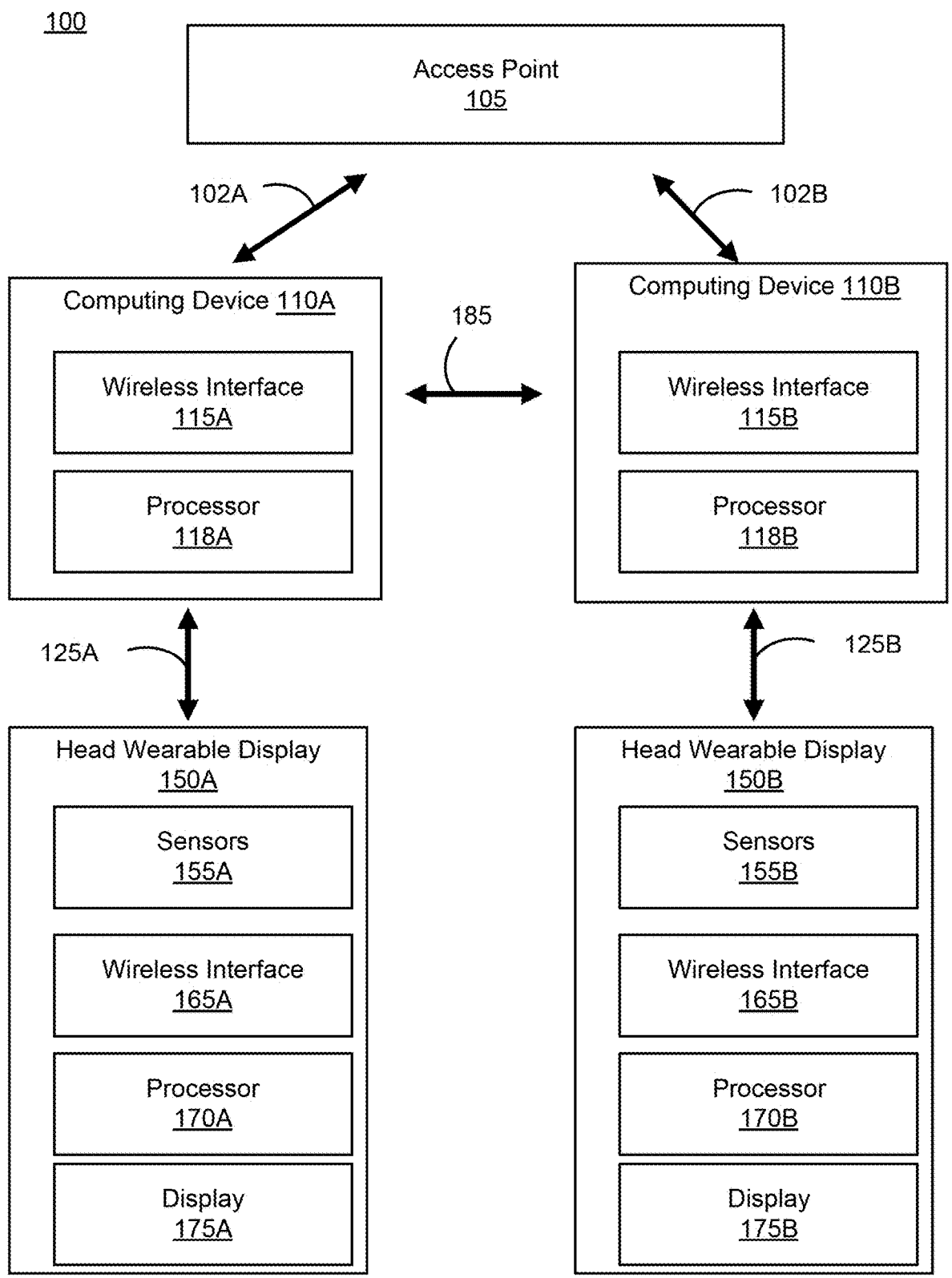
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to coordinating communication links for artificial reality. In one aspect, a first computing device (e.g., AR/VR computing device, sometimes referred as a compute or console device) may exchange data with a first station device (e.g., head wearable device) through a first communication link, and a second computing device (e.g., another AR/VR computing device, or compute or console device) may exchange data with a second station device through a second communication link. In one aspect, the second computing device may receive a first beacon frame for communication between the first computing device and the first station device. The first beacon frame may be configured to indicate an offset between a first beacon transmission time of the first beacon frame and a first data transmission time of the first computing device for communication between the first computing device and the first station device. The second computing device may determine or schedule, according to the offset of the first computing device, a second data transmission time of the second computing device to be separate from or non-overlapping with the first data transmission time of the first computing device. The second computing device may communicate with the second station device during the second data transmission time.

In one aspect, the first computing device and the second computing device may be (or operate as) soft access points (e.g., software enable access points) and/or station devices, that may receive content for artificial reality, for example, from a communication device or an access point (e.g., internet access point). The first station device and the second station device may be HWDs. The first computing device may receive sensor measurements indicating a location and orientation of the first station device through a first communication link. The first computing device may generate image data indicating image of a view of artificial reality corresponding to the location and/or orientation of the first station device, and can transmit the image data to the first station device through the first communication link for rendering. Similarly, the second computing device may receive sensor measurements indicating a location and/or orientation of the second station device through a second communication link. The second computing device may generate image data indicating image of a view of the same or different artificial reality corresponding to the location and orientation of the second station device, and can transmit the image data to the second station device through the second communication link for rendering.

In one aspect, the first computing device, the first station device, the second computing device, and the second station device may switch operations between the wake up mode and the sleep mode. In the corresponding wake up mode, the first computing device and the first station device may exchange data with each other. In the corresponding wake up mode, the second computing device and the second station device may exchange data with each other. In the corresponding sleep mode, the first computing device, the first station device, the second computing device. In the corresponding sleep mode, the second station device may disable communication to reduce power consumption. In one aspect, the first computing device and the second computing device may offset operating in the wake up mode (e.g., offset/separate their schedules of being in wake up mode) according to the beacon frame to reduce collisions or interference. For example, the first computing device and the first station device may operate in the wake up mode, while the second computing device and the second station device operate in the sleep mode. Similarly, the second computing device and the second station device may operate in the wake up mode, while the first computing device and the first station device operate in the sleep mode. Hence, multiple devices in a close proximity (e.g., less than 20 ft) may communicate through different communication links with reduced collisions or interference.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link 105 (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable the wireless interface 115 and the processor 170 may disable (e.g., may implement low power or reduced operation in) the wireless interface 165, such that the wireless interfaces 115, 165 may not consume power, or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the wireless interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the wireless interfaces 115, 165 to enter a subsequent wake up mode according to timing of the previous communication indicated by the stored information. For example, the wireless interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the wireless interfaces 115, 165 to resume communication via the channel or frequency band of the previous communication indicated by the stored information. Accordingly, the wireless interfaces 115, in 165 entering the wake up mode from the sleep mode may resume communication, while bypassing a scan procedure to search for available channels and/or performing handshake or authentication. Bypassing the scan procedure allows extension of a duration of the wireless interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference. Detailed descriptions on coordinating communication links of different devices are provided below with respect to FIGS. 3 and 4 below.

Figure 2:
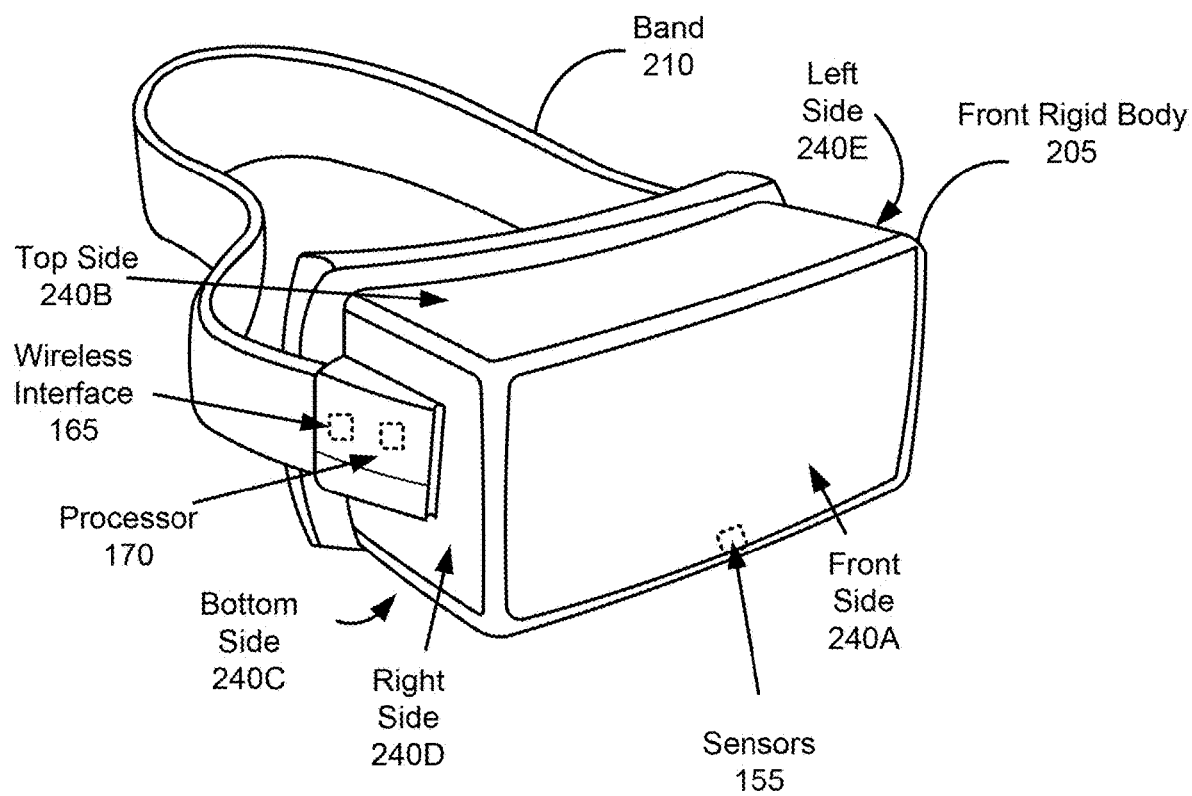
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
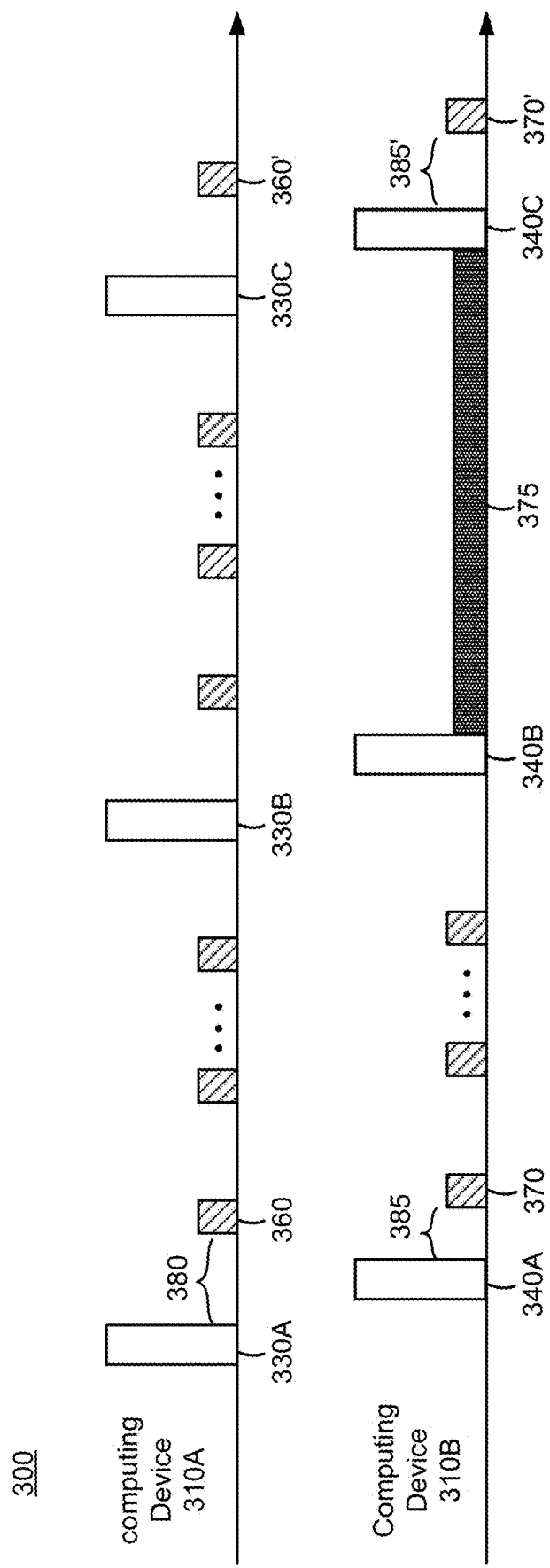
FIG. 3 is a timing diagram showing a process of coordinating communication links, according to an example implementation of the present disclosure.

FIG. 3 is a timing diagram 300 showing a process of coordinating communication links, according to an example implementation of the present disclosure. In one example, a computing device 310A (e.g., computing device 110A) may communicate with a first station device (e.g., HWD 150A) through a first communication link (e.g., wireless link 125A), and a computing device 310B (e.g., computing device 110B) may communicate with a second station device (e.g., HWD 150B) through a second communication link (e.g., wireless link 125B). The computing devices 310A, 310B may be mobile devices and can operate as soft APs.

In one approach, the computing devices 310A, 310B may periodically enter a sleep mode and a wake up mode. In the wake up mode, the computing device 310A may enable a wireless interface (e.g., wireless interface 115A) for communication with the first station device (e.g., HWD 150A). Similarly, in the wake up mode, the computing device 310B may enable a wireless interface (e.g., wireless interface 115B) for communication with the second station device (e.g., HWD 150B). In the sleep mode, the computing device 310A may disable the wireless interface to conserve power. Similarly, in the sleep mode, the computing device 310B may disable the wireless interface to conserve power.

In one approach, during beacon transmission time intervals 330A, 330B, 330C, the computing device 310A may operate in a wake up mode periodically (e.g., every 300 ms) and can transmit or broadcast beacon frames. Duration of each beacon transmission time interval 330 may be 1-2 ms. A beacon frame may announce/advertise/provide/indicate a SSID and/or a data rate of a wireless link, and can indicate a timing (e.g., target beacon transmission time (TBTT) and/or a duration) of transmission of the beacon frame. The beacon frame may also indicate a time offset 380 or a difference between a beacon transmission time interval 330 and a data transmission time interval 360 subsequent to the beacon transmission time interval 330. For example, the beacon frame indicates a time offset 380 between an end of the beacon transmission time interval 330 and a beginning of the subsequent data transmission time interval 360. The first station device may operate in the wake up mode during the beacon transmission time interval 330 to receive the beacon frame from the computing device 310A. The first station device may schedule to enter a wake up mode during a subsequent data transmission time interval 360. After scheduling to enter the wake up mode during the subsequent data transmission time interval 360, the first station device may operate in a sleep mode until a subsequent data transmission time interval 360. Similarly, after transmitting or broadcasting the beacon frame, the computing device 310A may schedule to enter a wake up mode during the subsequent data transmission time interval 360. After scheduling to enter the wake up mode during the subsequent data transmission time interval 360, the computing device 310A may operate in a sleep mode until the subsequent data transmission time interval 360.

According to the beacon frame (e.g., timing, scheduling or synchronization information in the beacon frame), the computing device 310A and the first station device (e.g., HWD 150A) may exchange data with each other during a data transmission time interval 360. In one example, the computing device 310A and the first station device may enter a wake up mode during a data transmission time interval 360 that begins at the time offset 380 from the end of the beacon transmission time interval 330. The computing device 310A and the first station device may enter a wake up mode for a subsequent data transmission time interval 360 every frame time (e.g., 11 ms). Duration of each data transmission time interval 360 may be 1-2 ms. For example, during the data transmission time interval 360, the computing device 310A may receive, from the first station device, sensor measurements indicating location and/or orientation of the first station device, and provide image data indicating a view of artificial reality corresponding to the location and/or orientation of the first station device. After the data transmission time interval 360, the computing device 310A and the first station device may enter the sleep mode until a subsequent data transmission time interval 360 or a subsequent beacon transmission time interval 330.

In one approach, the computing device 310B and the second station device (e.g., HWD 150B) may operate in a similar manner as the computing device 310A and the first station device during beacon transmission time intervals 340A, 340B, 340C, and the data transmission time intervals 370. During beacon transmission time intervals 340A, 340B, 340C, the computing device 310B may operate in a wake up mode periodically (e.g., every 300 ms) and can transmit or broadcast beacon frames of the computing device 310B. The beacon transmission time intervals 340A, 340B, 340C may be configured to be distinct/separate/non-overlapping from/with the beacon transmission time intervals 330A, 330B, 330C. Duration of each beacon transmission time interval 340 may be 1-2 ms. A beacon frame may announce a SSID and/or a data rate of a different wireless link (e.g., wireless link 125B) between the computing device 310B and the second station device, and can indicate a timing (e.g., TBTT and/or a duration) of transmission of the beacon frame. The beacon frame may also indicate a time offset 385 or a difference between a beacon transmission time interval 340 and a data transmission time interval 370 subsequent to the beacon transmission time interval 340. For example, the beacon frame indicates a time offset 380 between an end of the beacon transmission time interval 340 and a beginning of the subsequent data transmission time interval 370. The second station device may operate in the wake up mode during the beacon transmission time interval 340 to receive the beacon frame from the computing device 310B. The second station device may schedule to enter a wake up mode during a subsequent data transmission time interval 370. After scheduling to enter the wake up mode during the subsequent data transmission time interval 370, the second station device may operate in a sleep mode until a subsequent data transmission time interval 370. Similarly, after transmitting or broadcasting the beacon frame, the computing device 310B may schedule to enter a wake up mode during the subsequent data transmission time interval 370. After scheduling to enter the wake up mode during the subsequent data transmission time interval 370, the computing device 310B may operate in a sleep mode until the subsequent data transmission time interval 370.

According to the beacon frame, the computing device 310B and the second station device (e.g., HWD 150B) may exchange data with each other during a data transmission time interval 370. In one example, the computing device 310B and the second station device may enter a wake up mode during a data transmission time interval 370 that begins at the time offset 385 from the end of the beacon transmission time interval 340. The computing device 310B and the second station device may enter a wake up mode every frame time (e.g., 11 ms) for a data transmission time interval 370. Duration of each data transmission time interval 370 may be 1-2 ms. For example, the computing device 310B may receive, from the second station device, sensor measurements indicating location and orientation of the second station device, and provide image data indicating a view of artificial reality corresponding to the location and orientation of the second station device during the data transmission time interval 370. After the data transmission time interval 370, the computing device 310B and the second station device may enter the sleep mode until a subsequent data transmission time interval 370 or a subsequent beacon transmission time interval 340.

In one example, i) a first communication link between the computing device 310A and the first station device and ii) a second communication link between the computing device 310B and the second station device may interfere with each other. For example in FIG. 3, the data transmission time interval 360 and the data transmission time interval 370 may overlap with each other. In one aspect, the computing device 310B may detect unsuccessful communication, and adjust timing of the second communication link between the computing device 310B and the second station device to reduce interference due to the first communication link between the computing device 310A and the first station device. In one approach, for example in response to detecting the unsuccessful communication with the second station device, the computing device 310B may monitor for the beacon frame of the computing device 310A during a beacon listening time interval 375. The computing device 310B may monitor for the beacon frame of the computing device 310A periodically (e.g., every 1 second) during a beacon listening time interval 375. The beacon listening time interval 375 may be between the beacon transmission time intervals 340B, 340C. During the beacon listening time interval 375, the computing device 310B may enable the wireless interface (e.g., wireless interface 165B) to monitor for the beacon frame from the computing device 310A. For example, the computing device 310B may receive the beacon frame of the computing device 310A transmitted during the beacon transmission time interval 330C. In response to the beacon frame from the computing device 310A, the computing device 310B may determine (e.g., a starting time of) the data transmission time interval 360', by using the time of detection/reception of the beacon frame of the computing device 310A, and the time offset 380 in the beacon frame, e.g., by adding the time offset 380 to the time of detection/reception of the beacon frame, to obtain the starting time of the data transmission time interval 360'. In response to the beacon frame from the computing device 310A, the computing device 310B may determine or adjust the time offset 385 of the computing device 310B, such that the data transmission time interval 370' according to the adjusted time offset 385' may be distinct/separate/different from or not overlap with the data transmission time interval 360'. The computing device 310B may transmit or broadcast the beacon frame including the adjusted time offset 385' to the second station device, and schedule to enter the wake up mode during the data transmission time interval 370' according to the adjusted time offset 385'. After scheduling to enter the wake up mode during the data transmission time interval 370', the computing device 310B may enter a sleep mode until the subsequent data transmission time interval 370' according to the adjusted time offset 385'. The computing device 310B and the second station device may enter a wake up mode during the data transmission time interval 370' to exchange data with the second station device. Accordingly, the computing device 310B may communicate with the second station device through a second communication link with reduced interference due to the first communication link between the computing device 310A and the first station device.

In one example, the computing device 310A or the computing device 310B may determine a priority between the computing device 310A and the computing device 310B, and adjust the time offset 380, 385 according to the priority. The priority may be determined according to a policy. One example policy includes prioritizing an existing wireless link or a wireless link with a longer usage. For example, a beacon frame of a computing device may indicate a time duration (e.g., longevity) of successful/active wireless link established between the state device and a station device. In one example, the computing device 310A with a longer duration (e.g., greater longevity) of successful/active wireless link established may have priority over another computing device 310B. Hence, a computing device 310B intending to establish a newer communication link with the second station device may determine the time offset 385' to communicate with the second computing device without interfering with the older (e.g., longer/more/earlier established) communication link between the computing device 310A and the first station device.

Figure 4:
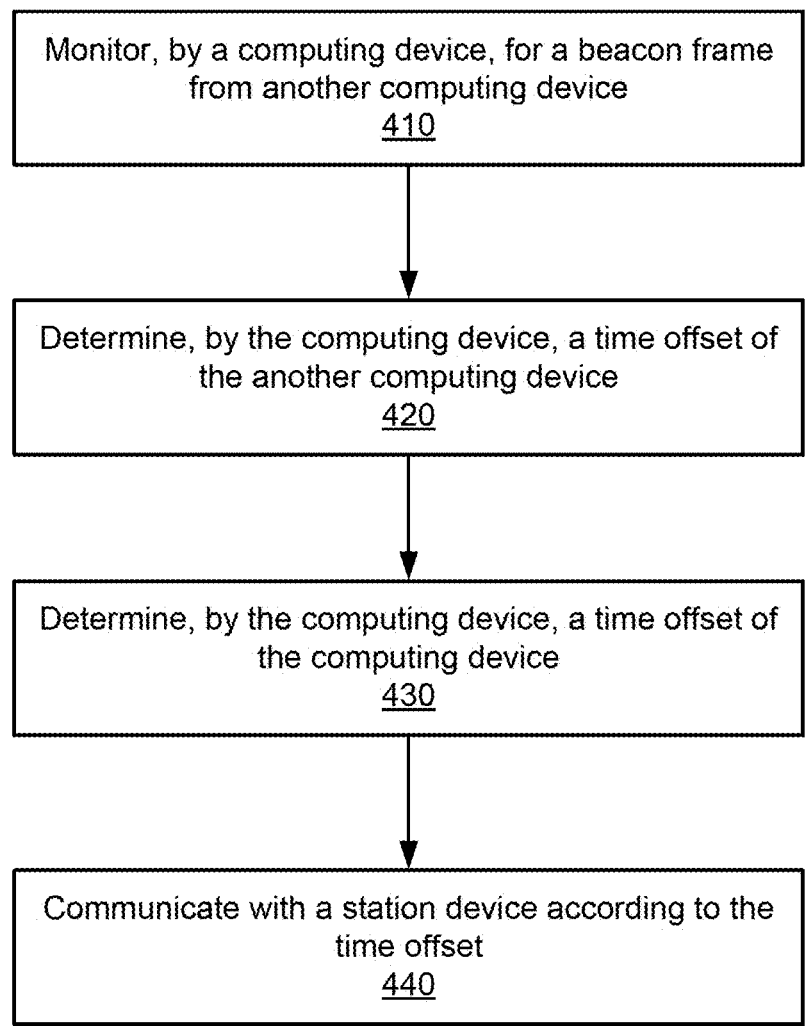
FIG. 4 is a flowchart showing a process of coordinating communication links, according to an example implementation of the present disclosure.

FIG. 4 is a flowchart showing a process 400 of coordinating communication links between multiple devices, according to an example implementation of the present disclosure. In some embodiments, the process 400 is performed by the computing device (e.g., computing device 310B or computing device 110B). In some embodiments, the process 400 is performed by other entities. In some embodiments, the process 400 includes more, fewer, or different steps than shown in FIG. 4.

In one approach, the computing device monitors 410 for a beacon frame from another computing device (e.g., computing device 310A or computing device 110B). The computing device may monitor for the beacon frame during beacon listening time interval 375. The beacon listening time interval 375 may be between beacon transmission time intervals (e.g., beacon transmission time intervals 340B, 340C) of the computing device. The computing device may monitor for the beacon frame of the another computing device during the beacon listening time interval 375, for example according to a trigger or schedule, such as in response to detecting unsuccessful communication with a station device (e.g., HWD 150B). The computing device may monitor for the beacon frame of the another computing device during the beacon listening time interval 375 periodically (e.g., every 1 second).

In one approach, the computing device receives the beacon frame of the another computing device, and determines 420 a time offset (e.g., time offset 380) of the another computing device. The time offset may be a time difference between a beacon transmission time interval 330 and a data transmission time interval 360 subsequent to the beacon transmission time interval 330 of the another computing device. For example, the time offset may be a time difference between an end of the beacon transmission time interval 330 and a beginning of the data transmission time interval 360 subsequent to the beacon transmission time interval 330. The computing device may determine the time offset according to the beacon frame.

In one approach, the computing device determines 430 a time offset (e.g., time offset 385) of the computing device, according to the time offset (e.g., time offset 380) and/or a data transmission time interval of the another computing device. The computing device may determine a data transmission time interval (e.g., data transmission time interval 360') of the another computing device according to the time offset and (e.g., an end or ending time of) the beacon transmission time interval (e.g., beacon transmission time interval 330) of the another computing device, and can adjust the time offset (e.g., time offset 385) of the computing device such that the data transmission time interval 370' may be distinct/separated or not overlap with the data transmission time interval 360' of the computing device 310A.

In one approach, the computing device communicates 440 with a station device (e.g., HWD 150B) according to the adjusted time offset 385'. The computing device may generate a beacon frame indicating the adjusted time offset 385' and can transmit or broadcast the beacon frame to the station device during a beacon transmission time interval (e.g., beacon transmission time interval 340C). After transmitting or broadcasting the beacon frame during the beacon transmission time interval, the computing device and the station device may schedule to enter a wake up mode during a subsequent data transmission time interval 370' according to the adjusted time offset 385'. After scheduling to enter the wake up mode, the computing device and the station device may enter a sleep mode to conserve power until the subsequent data transmission time interval 370'. The computing device and the station device may enter the wake up mode during the data transmission time interval 370' according to the adjusted time offset 385', and exchange data. For example, the computing device may receive, from the station device, sensor measurements indicating location and orientation of the station device, and provide image data indicating a view of artificial reality corresponding to the location and orientation of the station device during the data transmission time interval 370'. The station device may render artificial reality according to the image data. Advantageously, multiple computing devices and station devices in proximity (e.g., within 20 feet) may coexist and can operate with reduced interference by adaptively adjusting the time offset as disclosed herein.

Figure 5:
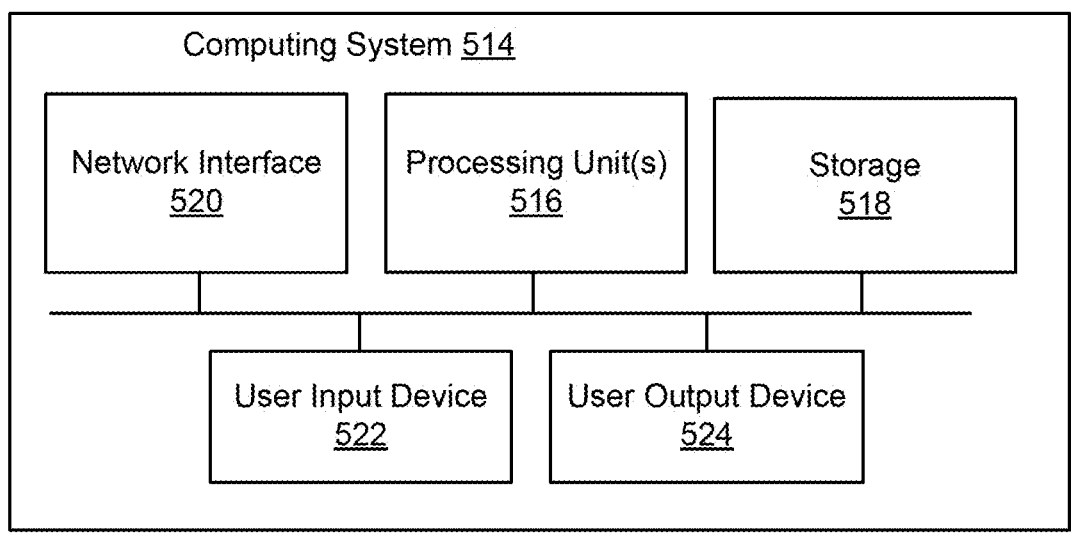
FIG. 5 is a block diagram of a computing environment according to an example implementation of the present disclosure.

Various operations described herein can be implemented on computer systems. FIG. 5 shows a block diagram of a representative computing system 514 usable to implement the present disclosure. In some embodiments, the computing device 110, the HWD 150 or both of FIG. 1 are implemented by the computing system 514. Computing system 514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:
1. A method comprising:
 receiving, by a second access point from a first access point, a first beacon at a first beacon transmission time, the first beacon indicating an offset between the first beacon transmission time and a first data transmission time of the first access point to a first station device;

determining, by the second access point according to the offset, a second data transmission time of the second access point; and communicating, by the second access point with a second station device, according to the second data transmission time.

2. The method of claim 1, further comprising:
communicating, by the second access point, according to the second data transmission time that is distinct from the first data transmission time.

3. The method of claim 1, further comprising:
monitoring, by the second access point, a beacon frame of the first access point in response to detecting, by the second access point, unsuccessful communication with the second station device; and receiving, by the second access point, the first beacon in response to the monitoring.

4. The method of claim 1, further comprising:
entering, by the second access point, a wake up mode from a sleep mode during a predetermined time interval within which the second access point receives the first beacon, the predetermined time interval including at least a time interval between two adjacent beacon transmission times of the second access point.

5. The method of claim 1, further comprising:
detecting, by the second access point, an unsuccessful communication with the second station device, and entering, by the second access point, a wake up mode from a sleep mode to receive the first beacon, in response to the detecting of the unsuccessful communication with the second station device.

6. The method of claim 1, comprising:
determining, by the second access point, the first data transmission time according to the first beacon transmission time and the offset, and scheduling, by the second access point, the second data transmission time to be distinct from the determined first data transmission time.

7. The method of claim 1, further comprising:
scheduling, by the second access point, a set of data transmission times of the second access point according to the first beacon transmission time and the offset, each data transmission time from the set of data transmission times of the second access point separate from a corresponding data transmission time from another set of data transmission times of the first access point.

8. A method comprising:
sending, by a first access point to a second access point, a first beacon of the first access point at a first beacon transmission time, the first beacon indicating an offset between the first beacon transmission time and a first data transmission time of the first access point for communication with a first station device; and causing, via the first beacon, the second access point to determine according to the offset a second data transmission time of the second access point distinct from the first data transmission time of the first access point, and to communicate with a second station device according to the second data transmission time.

9. A The method of claim 8, further comprising: entering, by the first access point, a wake-up mode from a sleep mode during a predetermined time interval, wherein the first access point is configured to send the first beacon, during the predetermined time interval.

10. The method of claim 9, wherein the predetermined time interval includes at least a time interval between two adjacent beacon transmission times of the first access point.

11. The method of claim 8, further comprising:
detecting, by the first access point, an unsuccessful communication with the first station device, and entering, by the first access point, a wake up mode from a sleep mode to send the first beacon, in response to detecting unsuccessful communication with the first station device.

12. The method of claim 8, further comprising:
causing, via the first beacon, the second access point to determine the second data transmission time according to the first beacon transmission time and the offset, and causing, via the first beacon, the second access point to schedule the second data transmission time to be distinct from the determined first data transmission time.

13. The method of claim 8, further comprising:
causing, via the first beacon, the second access point to schedule a set of data transmission times of the second access point according to the first beacon transmission time and the offset, each data transmission time from the set of data transmission times of the second access point separate from a corresponding one from another set of data transmission times of the first access point.

14. A non-transitory computer readable medium storing program instructions for causing at least one processor of a device to:
receive, via a receiver from a first access point, a first beacon at a first beacon transmission time, the first beacon indicating an offset between the first beacon transmission time and a first data transmission time of the first access point to a first station device;

determine, according to the offset, a second data transmission time of the device; and communicate, with a second station device, according to the second data transmission time.

15. The non-transitory computer readable medium of claim 14, wherein the program instructions cause the at least one processor to communicate according to the second data transmission time that is distinct from the first data transmission time.

16. The non-transitory computer readable medium of claim 14, wherein the program instructions cause the at least one processor to:
monitor a beacon frame of the first access point in response to detecting unsuccessful communication with the second station device; and receive, via the receiver, the first beacon in response to the monitoring.

17. The non-transitory computer readable medium of claim 14, wherein the program instructions cause the at least one processor to:
enter a wake up mode from a sleep mode during a predetermined time interval within which the device receives the first beacon, the predetermined time interval including at least a time interval between two adjacent beacon transmission times of the device.

18. The non-transitory computer readable medium of claim 14, wherein the program instructions cause the at least one processor to:
detect an unsuccessful communication with the second station device, and enter a wake up mode from a sleep mode to receive the first beacon, in response to the detecting of the unsuccessful communication with the second station device.

19. The non-transitory computer readable medium of claim 14, wherein the program instructions cause the at least one processor to:
- determine the first data transmission time according to the first beacon transmission time and the offset, and
- schedule the second data transmission time to be distinct from the determined first data transmission time.

20. The non-transitory computer readable medium of claim 14, wherein the program instructions cause the at least one processor to schedule a set of data transmission times of the device according to the first beacon transmission time and the offset, each data transmission time from the set of data transmission times of the device separate from a corresponding data transmission time from another set of data transmission times of the first access point.

* * * * *